Patented Aug. 1, 1939

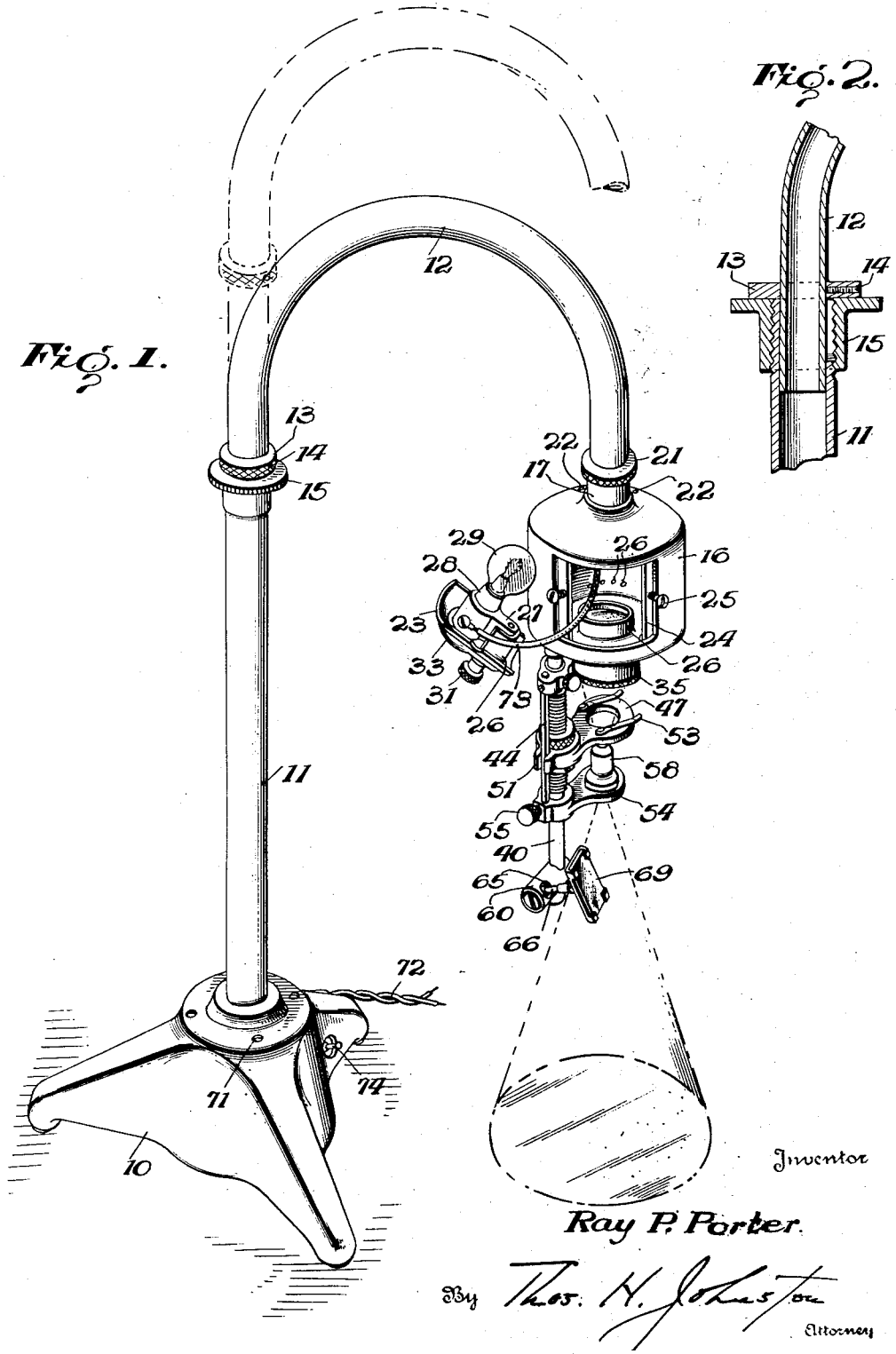

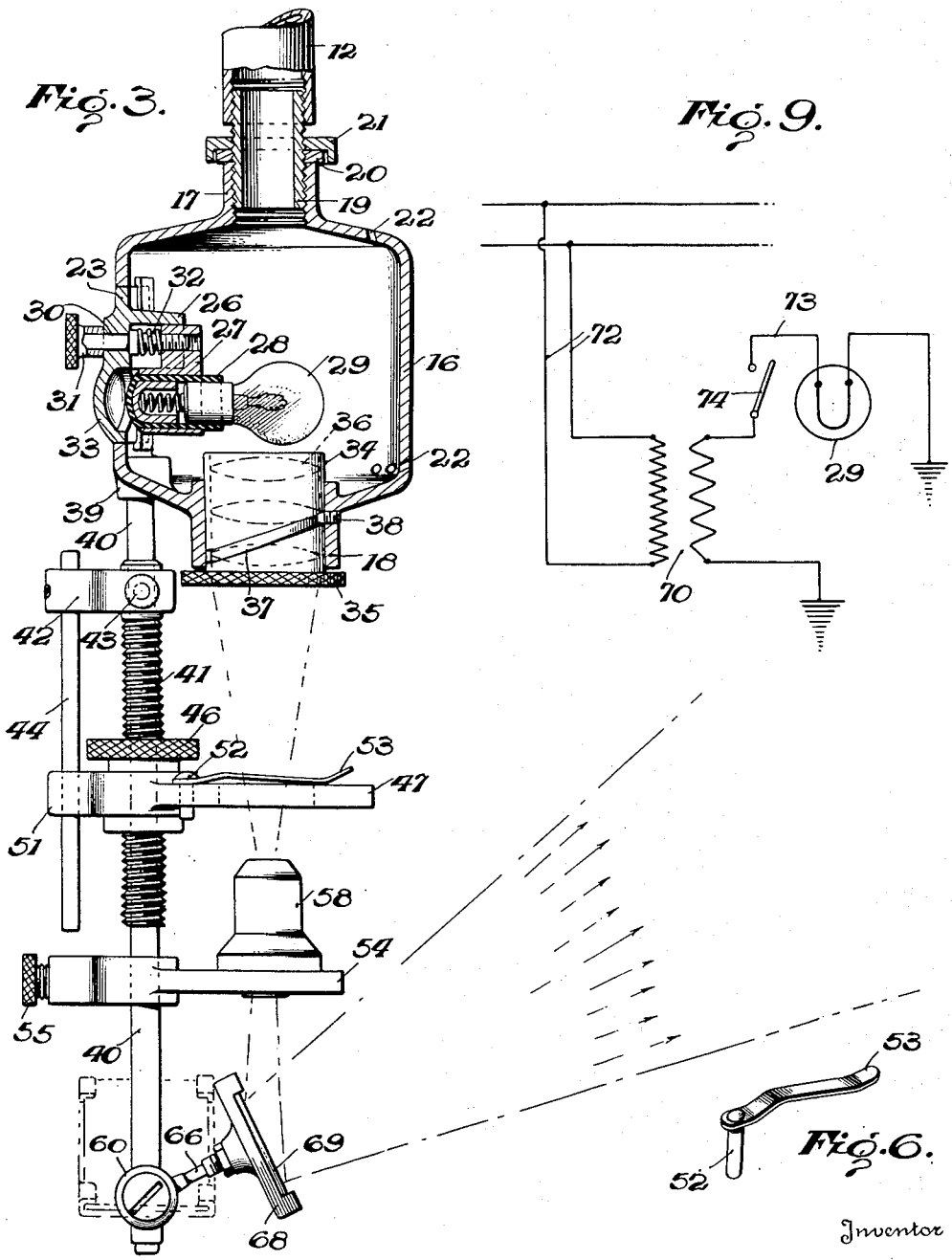

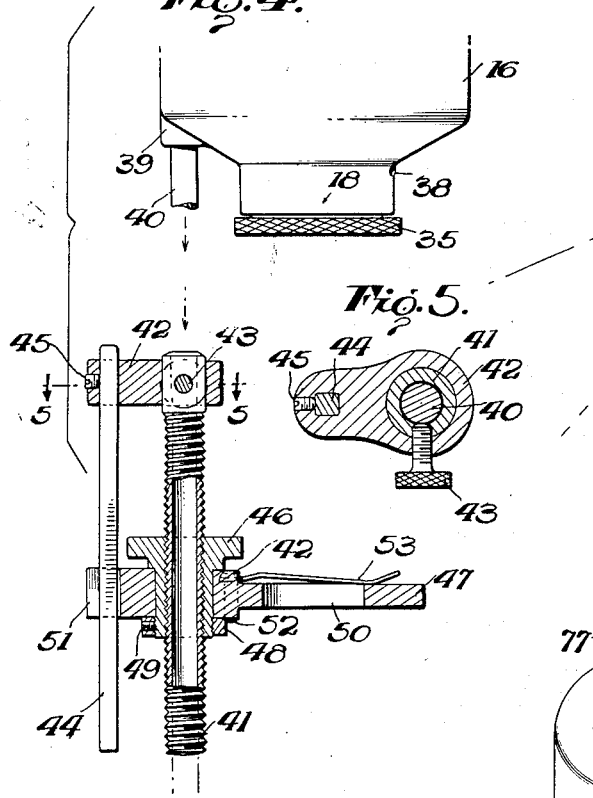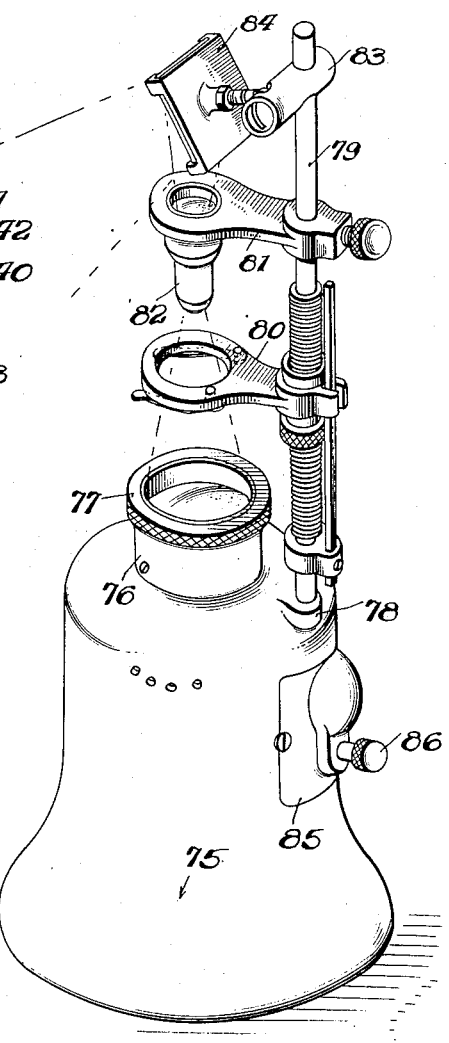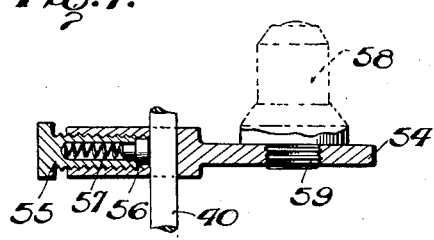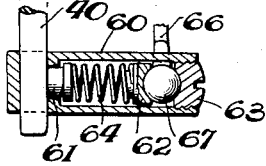

2,168,137

UNITED STATES PATENT OFFICE 2,168,137

MICROPROJECTOR

Ray P. Porter, El Reno, Okla.

Application August 30, 1937, Serial No. 161,673

10 Claims. (Cl. 88—24)

This invention relates to an improved microprojector of the general character disclosed in Patent Number 2,017,292 issued to me October 15, 1935, and adapted to throw on a screen, wall, table or the like an enlarged image of a chosen specimen temporarily positioned upon the device for such purpose.

An object of the invention is to refine the apparatus shown in my patent above noted and to provide for ease, quickness and accuracy of adjustment to obtain a maximum of clarity in the reflected image without delay and tedious manipulation.

A further object of the invention, in connection with the foregoing, is to provide a device wherein the specimen stage assembly will be slidably mounted for quick, rough adjustment, and wherein the stage itself may then be individually shifted by a screw threaded adjustment to a nicety.

Still another object of the invention is to provide a device wherein, when so desired, the image may be projected straight down, as, for instance, upon a table, wherein, should occasion so demand, the image may be reflected at practically any angle desired, thus eminently adapting the device for use in instructing a class or exhibiting desired specimens to an assembly, and wherein the heat produced by the light source will in no wise affect the specimen.

And the invention seeks, as a still further object, to provide a device which will be readily portable, which will be compact, which will be well adapted for general use, and which will be characterized by flexibility and capability of adjustment to meet practically any demand.

Other and incidental objects of the invention will appear during the course of the following description and in the accompanying drawings, wherein I have illustrated what I at present believe to be the ideal embodiment of my invention from among various other forms, arrangements, combinations and constructions, of which the invention is capable within the spirit and scope thereof.

Figure 1 is a perspective view of my improved device.

Figure 2 is a detail section showing the mounting of the goose-neck in the standard of the stand employed.

Figure 3 is a view partly in section and partly in elevation, particularly showing the projection apparatus.

Figure 4 is a view partly in elevation and partly in section particularly showing the mounting of the specimen stage assembly.

Figure 5 is a slightly enlarged transverse section on the line 5—5 of Figure 4.

Figure 6 is a detail perspective view of one of the specimen slide clamps.

Figure 7 is a detail section of the projecting lens carrier.

Figure 8 is a detail section of the mirror carrier.

Figure 9 is a diagrammatic view of the circuits employed.

Figure 10 is a perspective view showing a modification of the invention.

In carrying the invention into effect, I employ a stand including a hollow base 10 and fixed in the base is a vertical tubular standard 11 of resilient metal. Telescoping in the upper end of the standard is a tubular arm in the form of a goose-neck 12 on the adjacent end of which is adjustably fixed a stop collar 13, so that, as shown in dotted lines, the goose-neck may be raised or lowered for vertically adjusting the projection apparatus. presently to be described, as well as swung for rotatively adjusting said apparatus, and securing said collar is a set screw 14. As seen in Figure 2 of the drawings, the standard 11 is split at its upper end and screwed thereover is an internally tapered nut 15 adjustable for locking the goose-neck in vertically adjusted position as well as rotatively adjusted position.

Carried by the free end of the goose-neck 12, as particularly shown in Figure 3 of the drawings, is a cylindrical lamp housing 16 having top and bottom end walls, and formed on said walls are aligned upper and lower sleeves 17 and 18, the latter of which is somewhat larger in diameter than the former. The sleeve 17 is internally threaded to receive a nipple 19 which is screwed into the adjacent end of the goose-neck 12 for connecting the housing with said neck, and screwed on the nipple is a nut 20 over which is disposed a lock nut 21. Thus, the housing may be rotatively adjusted on the nipple and secured by the nuts 20 and 21.

The housing 16 is provided with appropriate ventilating apertures 22 which are disposed on an angle so that the light within the housing will not fog the image projected by the apparatus and removably mounted at one side of the housing is a door 23. Formed within the housing, as best seen in Figure 1, are vertical stop flanges 24 for the door adapted to prevent the leakage of light and engaged through said flanges are screws 25 removably securing the door in position. In Figure 1, the door is shown detached and inverted.

As brought out in Figure 3, the door 23 is internally flanged to provide an inverted channel-shaped guide member 26 and slidably fitting therein for horizontal adjustment is a lamp carrier 27 mounting an appropriate lamp socket 28 in which is removably fixed a suitable electric lamp 29. Swiveled through the door axially of the guide member 26 is an adjusting screw 30 engaged at its inner end in a suitable bore in the carrier and shouldered to coact with the door. Tightly pressed over the outer end of said screw is a knob 31 and interposed between the shoulder of said screw and the carrier 27 is a spring 32. Accordingly, as will be perceived, the knob 31 may be turned for adjusting the carrier 27 and correspondingly adjusting the lamp 29, the spring 32 serving to hold the parts in adjusted position. Formed in the door 23 is a bulged seat 33 adapted to accommodate the rear end of the socket 28 when the carrier is adjusted rearwardly.

Rotatively fitting within the lower sleeve 18 of the housing 16 is a condenser including a cylindrical condenser lens carrier 34 provided at its lower end with a knurled flange 35 so that the carrier may be rotatively adjusted with facility. Any appropriate number of suitable condenser lenses 36 are mounted in preferred manner within the carrier and formed in said carrier is an external spiral groove 37. Screwed through the wall of the sleeve to engage at its smooth inner end in said groove is a stud 38. Thus, as the sleeve is turned, said sleeve will be axially adjusted for positioning the condenser lenses 36 relative to the lamp 29 while, by turning the screw 30, the lamp may be accurately positioned over the upper end of said carrier so that the light rays may be sharply focused.

Formed on the lower end wall of the lamp housing 16 below and at one side of the door 23 is a boss 39 in which is fixed a vertically disposed depending rod 40 and shiftable on said rod is a specimen stage assembly. As particularly seen in Figures 3 and 4 of the drawings, this assembly includes a sleeve 41 which slidably fits the rod for free vertical movement thereon while exteriorly, the sleeve is screw threaded from its lower end to a point near the upper end thereof, and fixed on the smooth upper extremity of the sleeve is a head 42. Screwed through the head and through the sleeve to impinge the rod 40, as shown in detail in Figure 5, is a set screw 43.

Fixed to the head 42 to extend in parallel spaced relation to the sleeve 41 is a preferably square guide rod 44 and securing said rod to the head is a set screw 45. Screwed on the sleeve 41 is a nut 46 mounting a specimen stage 47 through which the nut is swiveled and screwed on the lower end of the nut is a stop collar 48 for rotatably connecting the nut with the stage, the collar being secured by a set screw 49. The stage 47 is provided with an opening 50 for the passage of light rays from the lamp 29 and formed on the inner end of the stage to snugly straddle the rod 44 are spaced lugs 51 adapted to coact with the rod for limiting the stage against swinging movement on the nut 46 while, however, the lugs may freely slide along the rod without binding. Frictionally engaged through suitable openings in the rear end portion of the stage are pins 52 and fixed to the upper ends of said pins, as seen in detail in Figure 6, are clamping springs 53 extending along the stage at opposite sides of the opening 50.

Slidable on the rod 40 below the sleeve 41 is a projecting piece carrier 54 and adjustable in the rear end of said carrier is a hollow screw 55. Mounted to coact with the rod is a preferably composition shoe 56 and fitting in the screw is a spring 57 urging the shoe to coact with the rod. Thus, as will be appreciated, by loosening the nut 55, the carrier 54 may be slidably as well as rotatively adjusted on the rod when, by again tightening the screw, the carrier may be fixed in adjusted position. Removably mounted on the carrier is a projecting piece 58 having a tubular nipple 59 screwed through a suitable opening in said carrier. A standard microscope objective is preferably employed for the projecting piece as it has been found that such a commercial unit embodies the proper lenses for the purposes of the present invention.

Slidable on the rod 40 below the projecting piece carrier 54 is a tubular mirror carrier 60 in which is mounted a preferably composition shoe 61 to coact with the rod and slidable in the carrier is a universal socket member 62. Screwed into the outer end of the carrier is a companion socket member 63 and interposed between the member 62 and the shoe is a spring 64. As seen in Figure 1 of the drawings, the carrier 60 is provided with a slot 65 through which is freely received an arm 66 and mounted on the inner end of said arm is a ball 67 clamped between the socket members 62 and 63. The member 63 is notched to receive a screw driver and by adjusting said member, the spring 64 may, as will be perceived, be tensioned to urge the shoe 61 to frictionally coact with the rod 40 while, of course, permitting sliding adjustment of the carrier on the rod as well as rotative adjustment of said carrier. Suitably mounted on the free end of the arm 66 is a frame 68 and fixed in said frame is a mirror 69 supported by the arm beneath the projecting piece 58.

Mounted within the base 10 of the stand is a transformer shown diagrammatically in Figure 9 of the drawings at 70. As the transformer may be of any approved construction, it has been deemed unnecessary to show the physical unit, but, preferably, the transformer is detachably secured in the base by screws 71. Supplying current to the transformer are circuit wires 72 and leading from one side of the secondary of the transformer through the standard 11 are gooseneck 12 into the housing 16 to the lamp socket 28 is a wire 73. As will be observed, the other side of the secondary of the transformer is grounded as is also one side of the lamp socket, and interposed in the circuit of the wire 73 is a suitable switch 74 which, as seen in Figure 1, is preferably mounted on the base 10. Thus, the switch may be conveniently operated to control the energization of the lamp 29.

The stage 47 is, of course, intended to receive a suitable specimen slide which will be held on the stage over the opening 50 by the clamping springs 53 so that the light rays from the lamp 29 may pass through the slide and, as will now be seen, the lamp may, as previously noted, be adjusted by means of the screw 30, to obtain the best projection of the light rays through the lenses 36 of the carrier 34, while focusing of said rays through the slide may be accomplished by adjusting said carrier. Furthermore, as will be seen, after loosening the set screw 43, said screw may be used as a handle for slidably as well as rotatably adjusting the entire specimen stage assembly on the rod 40 to position the specimen slide relative to the projecting piece 58, when the set screw may be again tightened for securing the assembly in adjusted position. A rough adjustment of the slide may thus be easily and quickly had when, by turning the nut 46, the stage 47 may be shifted individually along the sleeve 41 to obtain a fine adjustment of the slide relative to the projecting piece. As will be perceived, the specimen stage assembly may, if so desired, be swung aside entirely out of projecting position. The projecting piece 58 may, of course, be slidably as well as rotatably adjusted by manipulating the screw 55 and shifting the carrier 54 on the rod 40 while the carrier 60 may likewise be slidably and rotatably adjusted on said rod for positioning the mirror beneath the projecting piece. A high degree of illumination, in proportion to the candle-power of the lamp 29, will thus not only be obtained but also, the image projected may be easily, quickly and sharply focused.

As the mirror 69 is carried by the ball 67, the mirror may, as will be perceived, be readily positioned for reflecting the light at various angles for throwing the projected image upon a screen, wall or the like, thus eminently adapting the projector for class work while, when so desired, the mirror may, as shown in dotted lines in Figure 3, be swung aside and the image projected straight down onto a table or other chosen surface, the projecting apparatus being adjusted vertically by raising or lowering the goose-neck 12, as previously described.

It is also to be noted, in connection with the foregoing, that a left-handed operator, for instance, may, when facing the projecting apparatus, wish the rod 40 disposed at the left, as shown in Figure 1, so that the parts carried thereby may be conveniently adjusted while, conversely, a right-handed operator may wish said rod disposed at the right. To meet the requirement, the nuts 20 and 21 at the upper end of the housing 16 are loosened, when the housing may be given a half turn on the nipple 19 for changing the location of the rod to the position desired, when said nuts may be again tightened for firmly securing the housing in adjusted position.

In Figure 10 of the drawings I have shown a modification of the invention wherein the stand first described is eliminated and the lamp housing 75 is bell-shaped so that the housing may be rested at its larger end directly upon a table or other support. Moreover, in this modification, the transformer 70 and switch 74, previously described, are suitably mounted directly upon the housing. At its upper end, the housing is provided with a sleeve 76 like the sleeve 18 and the sleeve 76 mounts a lens carrier 77 like the lens carrier 34. Formed on the upper end wall of the casing is a boss 78 and fixed in said boss is an upstanding vertical rod 79 like the rod 40. The rod 79 carries a specimen stage assembly including a specimen stage 80, a carrier 81 mounting a projecting piece 82, and a carrier 83 mounting a mirror 84, all of these parts being identical with the corresponding parts of the construction first described and operating in identical manner. At one side, the housing 75 is provided with a door 85 like the door 23 and the lamp carried by the door is adjusted by a screw 86 like the screw 30. Except as specifically noted, the modified construction is in all respects identical with the projector first described, the modified structure providing a somewhat simpler arrangement wherein the image will be projected upwardly from the lamp housing instead of downwardly, as first described.

Having thus described my invention, what I claim is:

1. A micro-projector including a housing, an adjustable light source mounted therein, a condenser mounted to cooperate with the light source, means for adjusting the light source transversely with respect to the condenser, a door for the housing carrying said light source and said adjusting means and adapted to expose the same externally of the housing when the door is opened, a supporting element, a carrier mounted on said element and provided with an objective to cooperate with the condenser, and a specimen stage adjustable on said element along a path parallel to the optical axis between the condenser and objective independently thereof.

2. A micro-projector including a housing, a removable door carried thereby, an adjustable socket carried by the door, means on the door for adjusting said socket, a light source mounted in said socket, the door being removable for displacing the parts thereon from the housing, a condenser mounted to cooperate with the light source, an objective mounted to cooperate with said condenser, and a specimen stage mounted for adjustment in the optical axis between the condenser and objective independently thereof.

3. A micro-projector including a housing, a light source mounted therein, a condenser mounted to cooperate with the light source, a rod fixed to and sustained by the housing to project therefrom parallel to the axis of the condenser, a carrier engaged with the rod, an objective mounted on the carrier, a sleeve slidable and rotatable on the rod, a specimen stage, a nut swiveled through the stage and screwed on the sleeve, means securing the stage against swinging movement on the nut, the sleeve being slidably adjustable along the rod for positioning the stage between the condenser and objective as well as rotatable on the rod for swinging the stage aside and the nut being adjustable for individually positioning the stage between the condenser and objective, and means for securing the sleeve in rotative and slidably adjusted position.

4. A micro-projector including a housing, a light source mounted therein, a condenser upon the housing to cooperate with the light source, a rod fixed to and sustained by the housing to project therefrom parallel to the axis of the condenser, a carrier secured to the rod and provided with an objective to cooperate with the condenser, the carrier being separately adjustable along the rod for varying the spacing between the objective and the condenser, and a specimen stage mounted on the rod between and separate from the housing and carrier and separately adjustable in the optical axis along the rod toward the condenser and away from the objective or vice versa without disturbing the position of the objective relative to the condenser.

5. A micro-projector including a housing, a light source mounted therein, a condenser upon the housing to cooperate with the light source, a rod fixed to and sustained by the housing to project therefrom parallel to the axis of the condenser, a carrier secured to the rod and provided with an objective to cooperate with the condenser, the carrier being separately adjustable along the rod for varying the spacing between the objective and the condenser, and a specimen stage assembly mounted on the rod between and separate from the housing and carrier and separately adjustable as a unit along the rod toward the condenser and away from the objective or vice versa without disturbing the position of the objective relative to the condenser, said assembly including a stage separately adjustable on the assembly in the optical axis toward the condenser and away from the objective or vice versa while the carrier and objective remain in set position on the rod.

6. A micro-projector including a housing, a light source mounted therein, a condenser upon the housing to cooperate with the light source, a rod fixed to and sustained by the housing to project therefrom parallel to the axis of the condenser, a carrier secured to the rod and provided with an objective to cooperate with the condenser, the carrier being separately adjustable along the rod for varying the spacing between the objective and the condenser, a specimen stage assembly mounted on the rod between and separate from the housing and carrier and slidably movable for coarse adjustment separately as a unit along the rod toward the condenser and away from the objective or vice versa without disturbing the position of the objective relative to the condenser, said assembly including a stage, and means for mechanically adjusting the stage on said assembly in the optical axis for fine adjustment toward the condenser and away from the objective or vice versa while the carrier and objective remain in set position on the rod.

7. A micro-projector including a housing, a light source mounted therein, a condenser upon the housing to cooperate with the light source, a rod fixed to and sustained by the housing to project therefrom parallel to the axis of the condenser, a carrier secured to the rod and provided with an objective to cooperate with the condenser, the carrier being separately adjustable along the rod for varying the spacing between the objective and condenser, a specimen stage assembly mounted on the rod between and separate from the housing and carrier and including a specimen stage, said assembly being separately rotatable as a unit on the rod for swinging the stage aside without disturbing the position of the objective relative to the condenser and being separately slidable as a unit in a path parallel to the optical axis along the rod toward the condenser and away from the objective or vice versa without disturbing the position of the objective relative to the condenser, and means for securing the assembly in rotative and slidably adjusted position.

8. A micro-projector including a housing, a light source mounted therein, a condenser upon the housing to cooperate with the light source, a rod fixed to and sustained by the housing to project therefrom parallel to the axis of the condenser, a carrier secured to the rod and provided with an objective to cooperate with the condenser, the carrier being separately adjustable along the rod for varying the spacing between the objective and condenser, a specimen stage assembly mounted on the rod between and separate from the housing and carrier and including a specimen stage, said assembly being separately rotatable as a unit on the rod for swinging the stage aside without disturbing the position of the objective relative to the condenser and being separately slidable as a unit along the rod toward the condenser and away from the objective or vice versa without disturbing the position of the objective relative to the condenser, means for securing the assembly in rotative and slidably adjusted position, the stage being separately adjustable on said assembly in the optical axis toward or away from the condenser while the position of the objective relative to the condenser remains set, and means for separately adjusting the stage.

9. A micro-projector including a housing, a light source mounted therein, a condenser upon the housing to cooperate with the light source, a rod fixed to and sustained by the housing to project therefrom parallel to the axis of the condenser, a sleeve slidable on the rod, a stage carried by the sleeve and adjustable thereby toward or away from the condenser, means for securing the sleeve in set position longitudinally of the rod, means connecting the stage with the sleeve and adjustable longitudinally thereon for shifting the stage in the optical axis toward or away from the condenser, a carrier secured to the rod at the side of the stage remote from the condenser and provided with an objective to cooperate with the condenser, the carrier being separately adjustable along the rod for varying the spacing between the objective and the condenser, and means for securing the carrier in adjusted position on the rod.

10. A micro-projector including a housing, a light source mounted therein, a condenser upon the housing to cooperate with the light source, a rod fixed to and sustained by the housing to project therefrom parallel to the axis of the condenser, and a stage, objective and mirror all mounted in spaced relation on the rod and supported thereby to cooperate with the condenser and each adjustable separately longitudinally of the rod in the optical axis toward or away from the condenser without disturbing the position of the other parts relative to the condenser.

RAY P. PORTER.